US006708245B1

United States Patent
Okuda

(10) Patent No.: US 6,708,245 B1
(45) Date of Patent: Mar. 16, 2004

(54) INTERFACE CIRCUIT WITH IMPROVED INTEGRATION

(75) Inventor: Ryosuke Okuda, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/412,753

(22) Filed: Oct. 5, 1999

(30) Foreign Application Priority Data

May 14, 1999 (JP) .......................................... 11-134759

(51) Int. Cl.[7] .............................................. G06F 13/14
(52) U.S. Cl. ..................................................... 710/305
(58) Field of Search ................................. 710/305, 309, 710/313, 110; 370/340, 321, 280

(56) References Cited

U.S. PATENT DOCUMENTS

| 5,509,126 | A |   | 4/1996 | Oprescu et al. |        |
|-----------|---|---|--------|----------------|--------|
| 5,929,655 | A | * | 7/1999 | Roe et al.     | 326/82 |
| 6,173,342 | B1| * | 1/2001 | Tsunoda et al. | 710/8  |
| 6,202,103 | B1| * | 3/2001 | Vonbank et al. | 710/15 |
| 6,212,633 | B1| * | 4/2001 | Levy et al.    | 713/153|
| 6,247,083 | B1| * | 6/2001 | Hake et al.    | 710/107|
| 6,397,277 | B1| * | 5/2002 | Kato et al.    | 710/104|

FOREIGN PATENT DOCUMENTS

JP   6-237285   8/1994
JP   11-4240    1/1999

OTHER PUBLICATIONS

"IEEE Standard for a High Performance Serial Bus (IEEE Std 1394–1995)" (IEEE Aug. 30, 1996).
"P1394a Draft Standard for a High Performance Serial Bus (Supplement)" (IEEE Mar. 15, 1998).

* cited by examiner

*Primary Examiner*—Sumati Lefkowitz
*Assistant Examiner*—Xuong Chung-Trans
(74) *Attorney, Agent, or Firm*—Burns, Doane, Swecker & Mathis, L.L.P.

(57) ABSTRACT

Some of the circuits for executing processes on the physical layer are accommodated in a first chip that includes a link layer circuit. More specifically, an arbiter circuit composed only of a logic circuitry and having a relatively large circuit scale, and state machines, built in a control circuit, are accommodated in the first chip in the form of a control signal generation circuit. The other portions of the physical layer circuit remains in the second chip. A higher degree of integration of the first chip results in a higher degree of integration of many of the circuitry for executing processes on the physical layer.

4 Claims, 8 Drawing Sheets

FIG.3

| CTL SIGNAL | COMMAND | DIRECTION OF D SIGNAL | CONTENT OF D SIGNAL |
|---|---|---|---|
| 000 | IDLE STATE | LINK → PHY | NONE |
| 001 | OUTPUT SPEED CODE | LINK → PHY | SPEED CODE (ONE OF THREE VALUES) |
| 010 | INPUT SPEED CODE | PHY → LINK | SAMPLE VALUES OF SPEED CODE AND PORT STATUS |
| 011 | OUTPUT ARBITRATION CONTROL SIGNAL | LINK → PHY | ARBITRATION CONTROL SIGNAL VALUE (ONE OF SIX VALUES) |
| 100 | OUTPUT ARBITRATION CONTROL SIGNAL | PHY → LINK | ARBITRATION CONTROL SIGNAL SAMPLE VALUE |
| 101 | SET SPEED | LINK → PHY | SPEED CODE (ONE OF THREE VALUES) |
| 110 | DATA TRANSMISSION | LINK → PHY | DATA FOR TRANSMISSION |
| 111 | DATA RECEPTION | PHY → LINK | RECEIVED DATA |

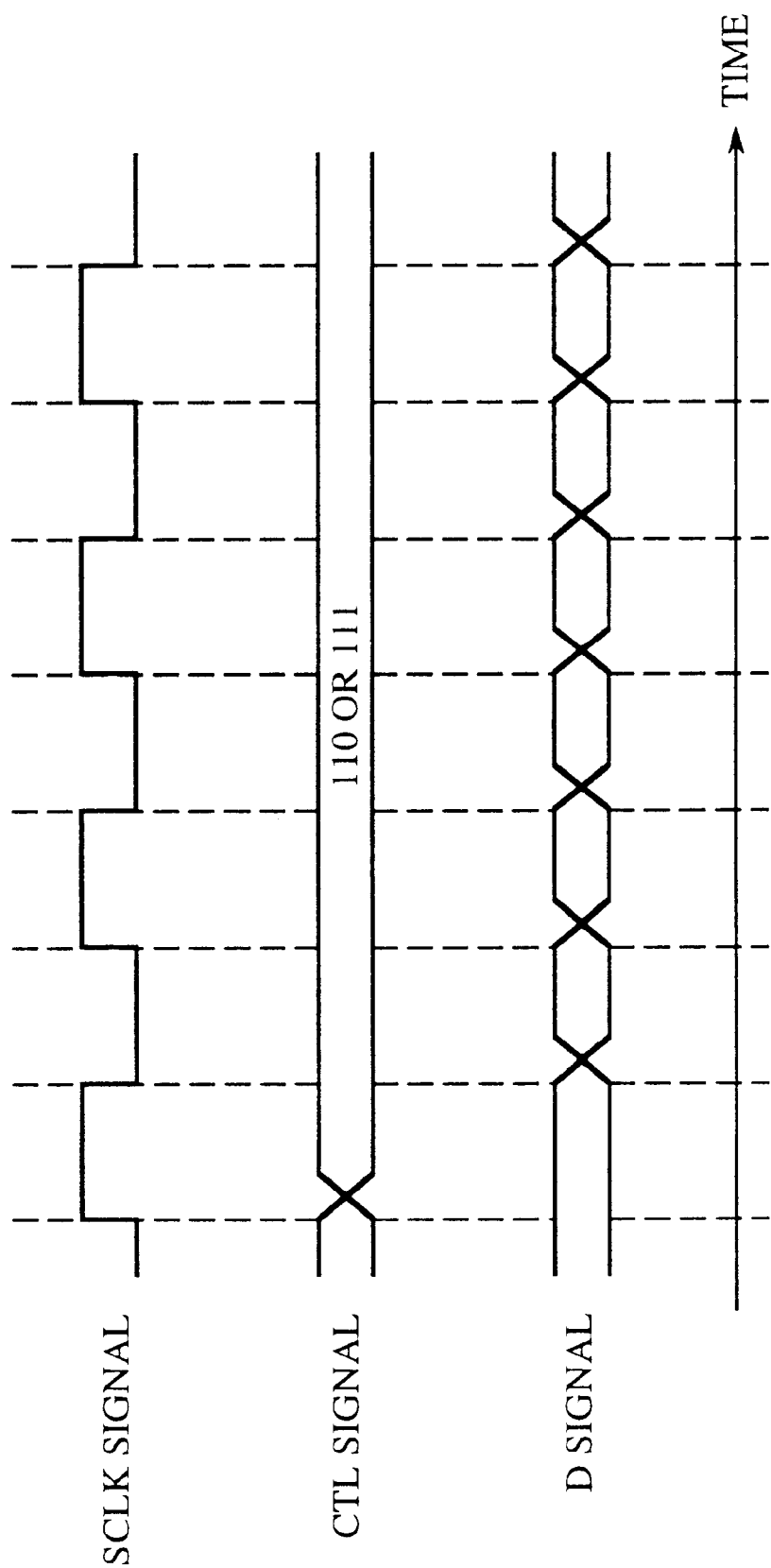

INTERFACE CIRCUIT WITH IMPROVED INTEGRATION

BACKGROUND OF THE INVENTION

1. Field of the Invention

The present invention generally relates to interface circuits and, more particularly, to an interface circuit for executing processes on the link layer and the physical layer of the serial bus interface that complies with IEEE Standard 1394.

2. Description of the Related Art

The serial bus interface that complies with IEEE Standard 1394 (hereinafter, referred to as IEEE 1394 serial bus) includes a plurality of functions constituting a hierarchy that includes the physical layer, the link layer and the transaction layer in an ascending order of abstraction. The physical layer and the link layer are often implemented as hardware.

FIG. 7 is a block diagram showing a related-art interface circuit described in "IEEE Standard for a High Performance Serial Bus (IEEE Aug. 30, 1996)" and "P1394a Draft Standard for a High Performance Serial Bus (Supplement) (IEEE Mar. 15, 1998). Referring to FIG. 7, the related-art interface circuit includes an integrated circuit for the link layer (hereinafter, referred to as a link chip) 101 for executing processes on the link layer of the IEEE 1394 serial bus interface and an integrated circuit for the physical layer (hereinafter, referred to as a PHY chip) 102 for executing processes on the physical layer of the IEEE 1394 serial bus interface.

The PHY chip 102 includes a clock generation circuit 121 for generating a local clock SCLK for the interface circuit, an encoder circuit 122 for converting data for transmission, supplied in the form of a 4-bit parallel signal, into a serial signal, generating a strobe signal based on the converted data, and supplying the strobe signal and the converted data to a port output control circuit 123 also included in the PHY chip 102. The port output control circuit 123 controls transceiver circuits 124A and 124B also included in the PHY chip 102 to transmit an arbitration control signal or the converted data and the strobe signal combined.

The transceiver circuit 124A uses the strobe signal to drive a twisted-pair cable A (hereinafter, referred to as a TPA cable) that complies with the IEEE Standard 1394, receives data transmitted from an adjacent interface circuit via the TPA cable, transmits and receives the arbitration control signal and receives a speed code indicating a data transfer rate. The transceiver 124B uses the data for transmission to drive the twisted-pair cable B (hereinafter, referred to as a TPB cable) that complies with IEEE Standard 1394, receives the strobe signal from an adjacent interface circuit via the TPB cable, transmits and receives the arbitration control signal and transmits the speed code.

The PHY chip 102 also includes a data resync circuit 125 for synchronizing the data received by the transceiver circuits 124A and 124B via the IEEE Std 1394 cables with the clock signal generated by the clock generation circuit 121. There is also included a decoder circuit 126 that provides an interface for supplying received data processed by the data resync circuit 125 to the link chip 101 in the form of a 4-bit parallel signal.

The PHY chip 102 also includes an arbiter circuit 127 for controlling, upon receipt of an arbitration request signal (hereinafter, referred to as a LREQ signal) from the link chip 101, states of the PHY chip 102 using a built-in state machine so as to execute an arbitration process. There is also included a control circuit 128 for exchanging a control signal (hereinafter, referred to as a CTL signal), indicating the status of transmission and reception, with the link chip 101, and using built-in state machines to execute, upon receipt of a predetermined control signal (hereinafter, referred to as a LPS signal) from the link chip 101, processes such as the reset of the status of the interface circuit in accordance with the LPS signal.

IEEE Standard 1394 calls for an input withstand voltage of −0.5−+2.8 volts in the transceiver circuits 124A and 124B. In order to secure the withstand voltage of this level, a microfabrication process of 0.3 μm or greater should be used to fabricate the transceiver circuits 124A and 124B of the physical chip 102.

A description will now be given of the operation of the interface circuit according to the related art.

Data for transmission is supplied as a parallel signal from the link chip 101 to the encoder circuit 122. The encoder circuit 122 converts the supplied parallel signal into a serial signal and generates a strobe signal based on the converted signal. The port output control circuit 123 supplies the serial signal for transmission and the strobe signal to the transceiver circuits 124A and 124B. The IEEE Std 1394 cables TPA and TPB are driven by the strobe signal and the data signal, respectively, so that the data for transmission is sent to an adjacent interface circuit.

When a serial signal containing transmitted data and a strobe signal are received by the transceiver circuits 124A and 124B, the serial signal and the strobe signal are supplied to the data resync circuit 125. The data resync circuit retrieves the transmitted data and the transmitted clock signal from the serial signal and the strobe signal. The data resync circuit 125 synchronizes the transmitted data thus retrieved with the clock signal generated by the clock generation circuit 121 so as to output the synchronized data to the decoder circuit 126. The decoder circuit 126 feeds the transmitted data thus supplied to link chip 101 in the form of a 4-bit parallel signal.

In an arbitration process, the link chip 101 supplies a LREQ signal to the arbiter circuit 127. The arbiter circuit 127 controls the other components of the PHY chip 102 so that an arbitration control signal is properly exchanged with an adjacent interface circuit.

When the interface circuit is reset, the link chip 101 supplies a LPS signal to the control circuit 128 so that the control circuit 128 executes a reset process such as a port reset using the built-in state machines.

Japanese Laid-Open Patent Application No. 11-4240 and No. 6-237285 disclose the technology related to the above-described interface circuit.

Since the related-art interface circuit requires that the microfabrication process of 0.3 μm or greater be used to fabricate the entirety of the physical chip 102, the benefit of cost reduction by applying the current fabrication technology (0.1–0.2 μm process) to the circuits other than the transceiver circuits 124A and 124B is not readily available.

Another disadvantage of the related-art interface circuit is that a total of thirteen (=1+1+2+8+1) cables are required for the SCLK signal (requiring one cable), the LREQ signal (one cable), the CTL signal (two cables), the LPS signal (one cable) and the data (the D signal containing a total of eight bits each requiring one cable) exchanged between the link chip 101 and the encoder circuit 122, and between the link chip 101 and the decoder circuit 126. Consequently, it has been difficult to reduce the cost of fabricating the circuit as a whole.

SUMMARY OF THE INVENTION

Accordingly, an object of the present invention is to provide an interface circuit in which the aforementioned drawbacks are eliminated.

Another and more specific object of the present invention is to reduce the cost of fabricating an interface circuit by accommodating some of the circuits for executing processes on the physical layer in a link chip that includes a link layer circuit. More specifically, an arbiter circuit, composed only of a logic circuitry and having a relatively large circuit scale, and state machines, built in a control circuit, are accommodated in the link chip in the form of a control signal generation circuit. The other portions of the physical layer circuit remains in the second chip. A higher degree of integration of the first chip using the current microfabrication technology results in a higher degree of integration of many of the circuitry for executing processes on the physical layer. The invention also has an object of reducing the number of cables between the link chip and the PHY chip so as to reduce the cost of the interface circuit.

The aforementioned objects can be achieved by an interface circuit for executing processes on a link layer and a physical layer of an interface that complies with IEEE Standard 1394, comprising: a first chip having a link layer circuit for executing processes on the link layer and a first control circuit for executing state transitions of the processes on the physical layer; and a second chip having a physical layer circuit for executing processes on the physical layer based on the state transitions executed by the first control circuit.

The first control circuit may generate a control signal corresponding to a state of the processes on the physical layer, and the second chip may include a second control circuit for controlling the physical layer circuit in accordance with a control signal.

The second chip may be provided with physical layer circuits for an equal number of ports, second control circuits for the equal number of ports, and a port control circuit for connecting with the first chip the physical layer circuit and the second control circuit corresponding to a selected port.

The first chip may be provided with a first time-division transfer circuit and the second chip may be provided with a second time-division transfer circuit so as to transfer the control signal from the first chip to the second chip according to time-division multiplexing, the first and second time-division transfer circuit sharing a first cable between the first chip and the second chip; when data is being transmitted or received, the first control circuit may stop time-division transfer of the control signal by the first time-division transfer circuit and supply a data indication signal indicating that the data is being transmitted or received to the second control circuit using a second cable different from the first cable; and the second control circuit may stop time-division transfer of the control signal by the second time-division transfer circuit when the data indication signal is supplied.

Cables used in the first chip may be smaller than those used in the second chip.

According to the present invention, a higher degree of integration of the first chip using the current microfabrication technology results in a higher degree of integration of many of the circuitry for executing processes on the physical layer. The invention also reduces the number of cables between the link chip and the PHY chip so as to reduce the cost of the interface circuit.

In further accordance with the invention, the number of cables between the link chip and the PHY chip is prevented from increasing even when a plurality of ports are provided on the physical layer.

In still further accordance with the invention, the number of cables is reduced by providing time-division transfer circuits.

BRIEF DESCRIPTION OF THE DRAWINGS

Other objects and further features of the present invention will be apparent from the following detailed description when read in conjunction with the accompanying drawings, in which:

FIG. 3 lists values of a CTL signal generated by a control signal generation circuit, meaning of commands corresponding to the respective values, direction of data (D signal) transferred between a first chip and a second chip, content of the D signal, in relation each other;

FIG. 4 is a timing chart showing an example of how a clock signal SCLK, the CTL signal and the D signal are related to each other in data transmission and reception;

DETAILED DESCRIPTION OF THE PREFERRED EMBODIMENTS

Embodiment 1

Figure 1:
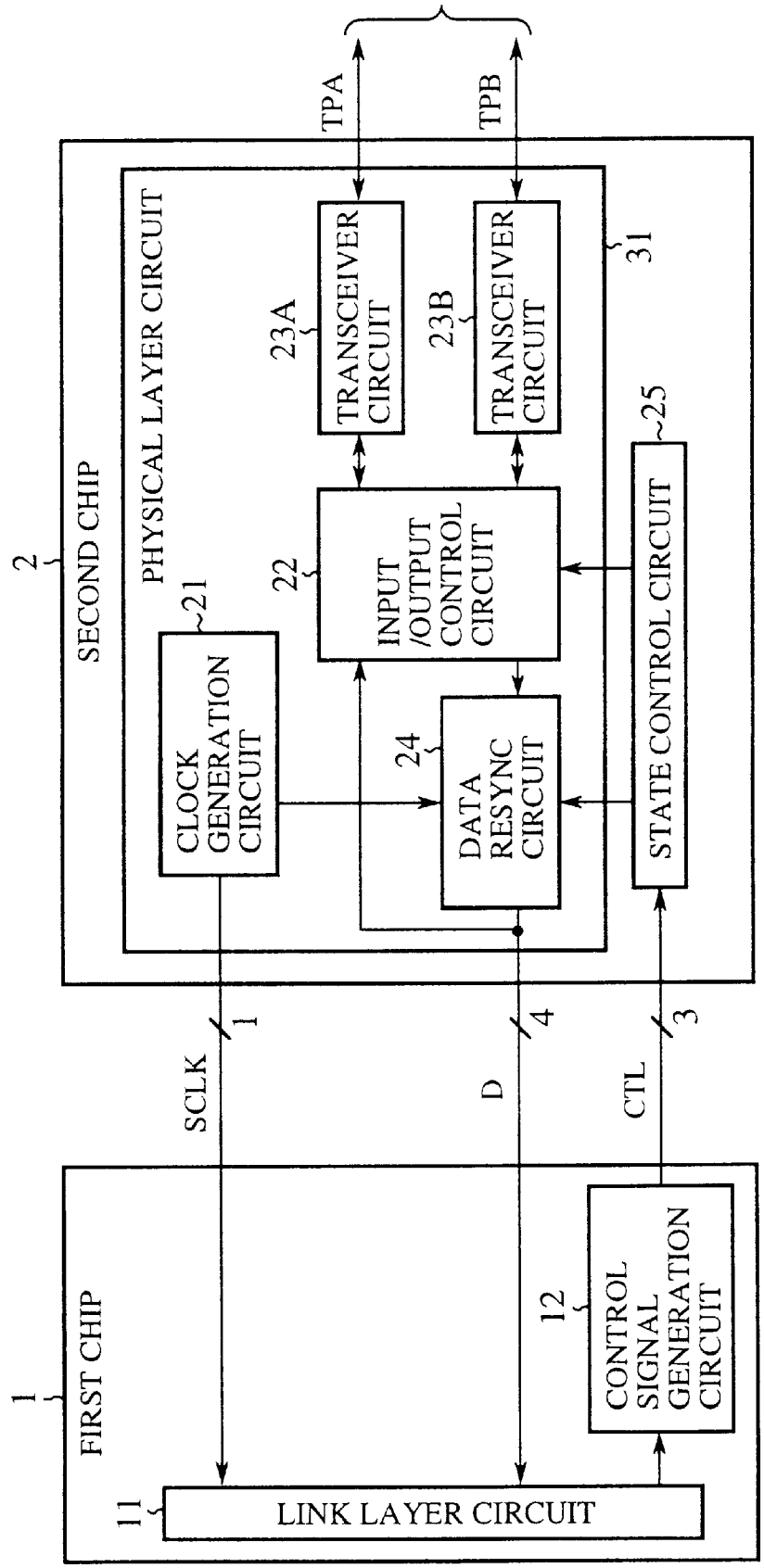
FIG. 1 is a block diagram showing the construction of an interface circuit according to a first embodiment of the present invention.

FIG. 1 is a block diagram showing the construction of an interface circuit according to the first embodiment of the present invention. The interface circuit includes a link chip 1 and a physical chip 2. The link chip 1 comprises a link layer circuit 11 and a control signal generation circuit 12. The link layer circuit 11 executes processes on the link layer of the IEEE 1394 serial bus interface. The control signal generation circuit 12 executes state transitions in an arbitration process and a reset process, processes that are executed on the physical layer. The control signal generation circuit 12 also generates control signals corresponding to different states.

The physical chip 2 comprises a physical layer circuit 31 and a state control circuit 25. The physical layer circuit 31 executes processes on the physical layer of the IEEE 1394 serial bus interface. The state control circuit 25 controls the physical layer circuit 31 in accordance with the control signal from the control signal generation circuit 12. Since the first chip 1 is composed only of a logic circuitry, the first chip 1 can be fabricated with a higher degree of integration than the second chip 2.

The physical layer circuit 31 includes a clock generation circuit 21 for generating a local clock signal SCLK for use in the interface circuit. The frequency of the clock signal SCLK is set to 49.152 MHz. The clock signal generation circuit 21 may be provided in the first chip 1. In that case, the clock signal SCLK is supplied from the first chip 1 to the second chip 2.

The physical layer circuit 31 also includes an input/output control circuit 22 for executing transmission and reception of data and a speed code under the control of the state control circuit 25.

Figure 7:
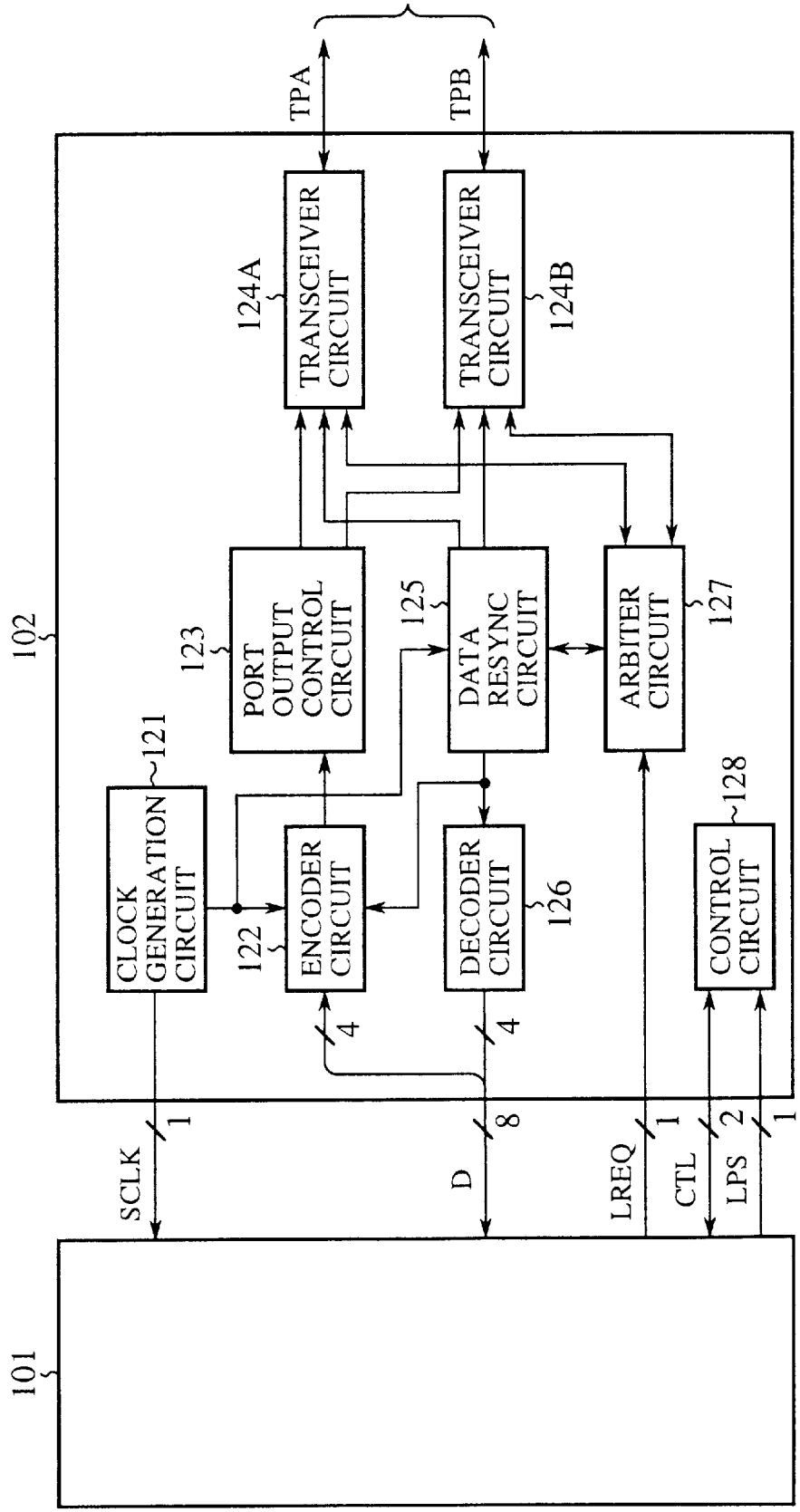
FIG. 7 is a block diagram showing an interface circuit according to the related art.

Coupled to the input/output control circuit 22 is a transceiver circuit 23a for driving the 1394 TPA cable with the strobe signal, receiving data transmitted from an adjacent interface circuit via the TPA cable, transmitting and receiving the arbitration control signal and receiving a speed code indicating a data transfer rate. Also coupled to the input/output control circuit 22 is a transceiver circuit 23B for driving the 1394 TPB cable with the transmitted data, receiving the strobe signal from an adjacent interface circuit via the TPB cable, transmitting and receiving the arbitration control signal and transmitting the speed code. The transceiver circuits 23A and 23B may be identical with the transceiver circuits 124A and 124B of FIG. 7, respectively.

Figure 2A:
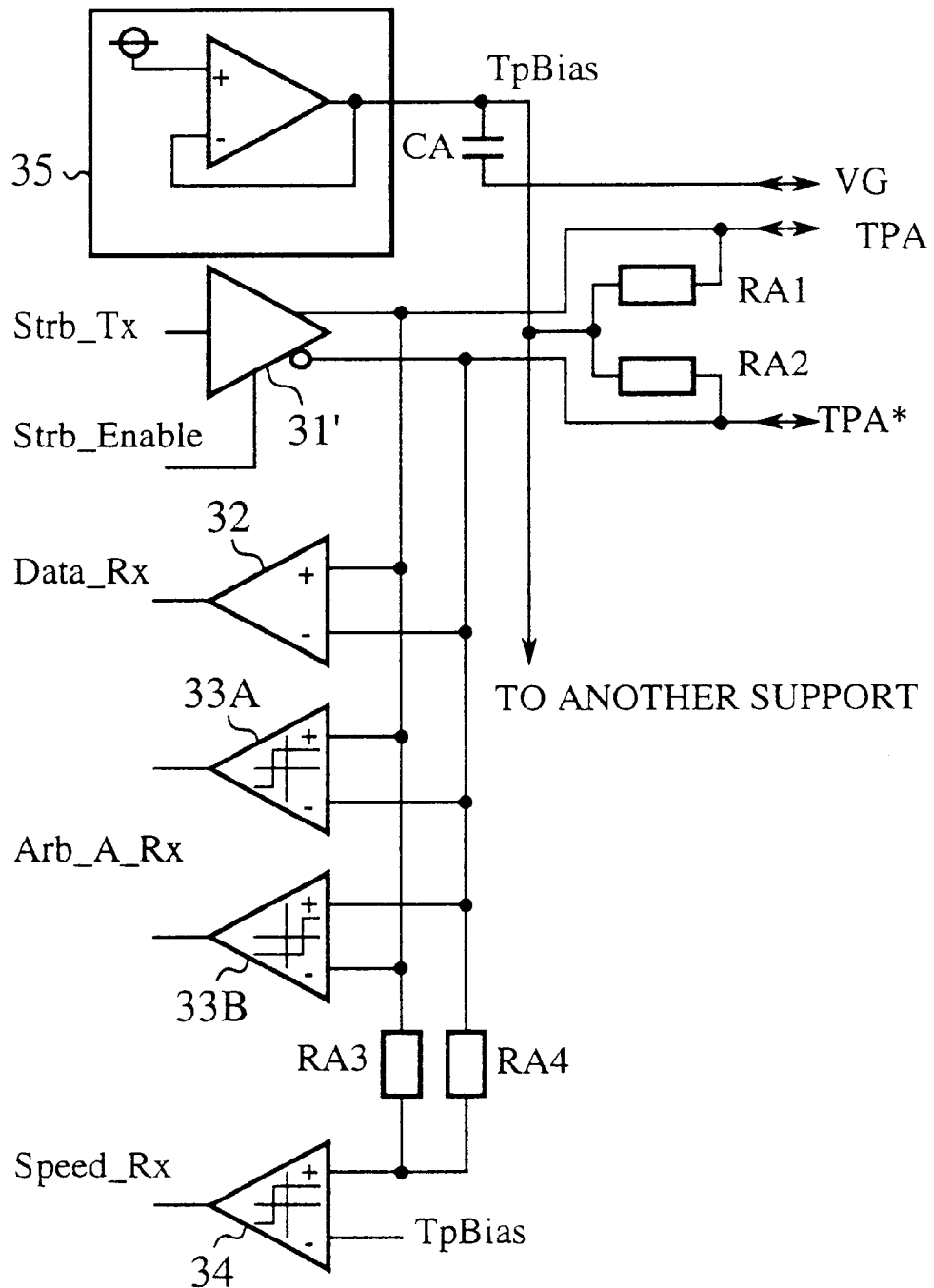
FIG. 2A is a circuit diagram showing the construction of a transceiver circuit of FIG. 1.
Figure 2B:
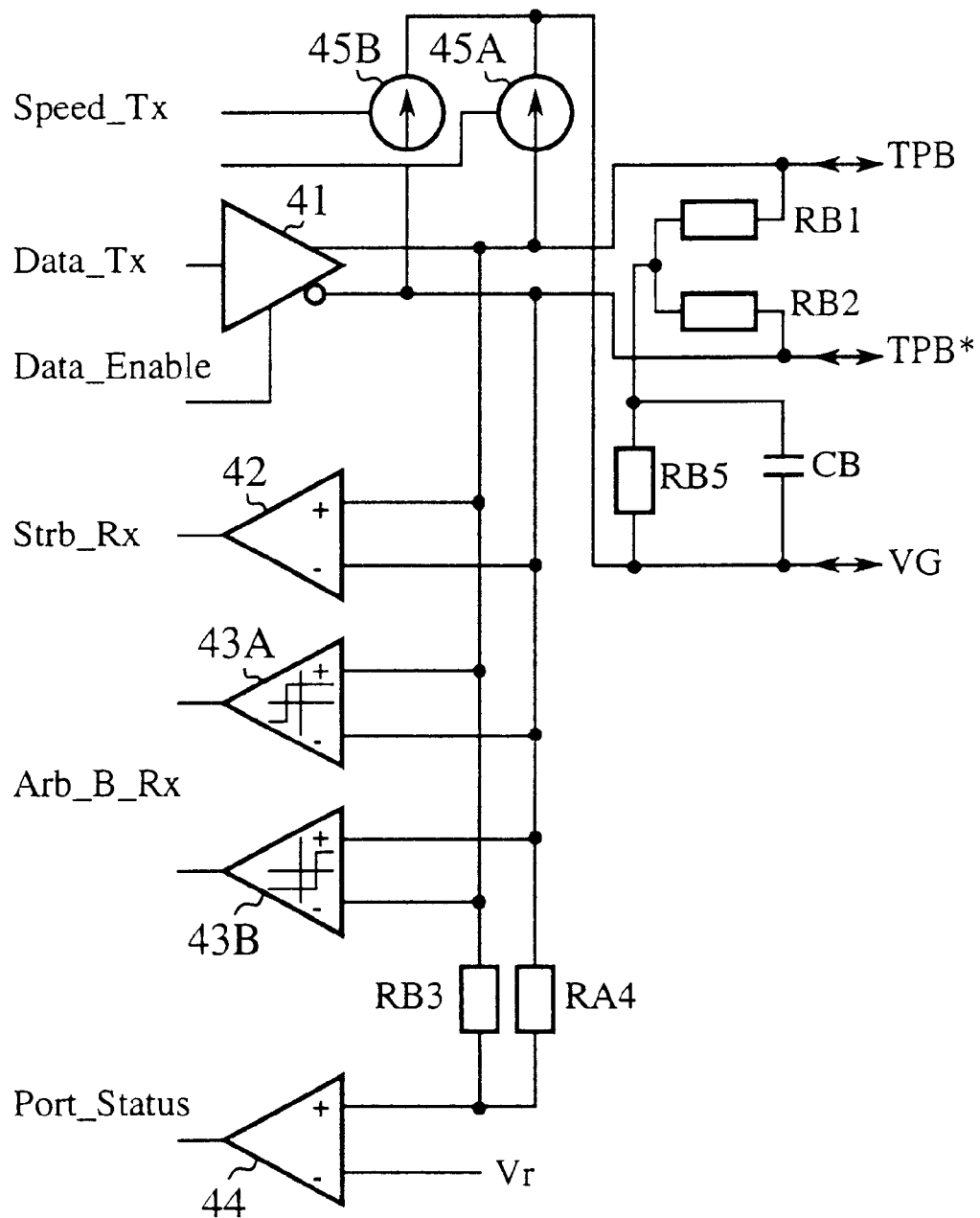
FIG. 2B is a circuit diagram showing the construction of another transceiver circuit of FIG. 1.

FIGS. 2A and 2B are circuit diagrams showing the transceiver circuits 23A and 23B of FIG. 1, respectively. Referring to FIG. 2A, the transceiver circuit 23A comprises a driver 31' for driving a TPA cable pair (the TPA cable and TPA* cable as illustrated) with a strobe signal Strb_Tx, a receiver 33 for receiving data Data_Rx, comparators 33A and 33B for retrieving an arbitration value Arb_A_Rx, and a comparator 34 for retrieving a speed code Speed_Rx by comparing the voltage provided by a bias circuit 35 with the voltage at a node between the TPA cable, subject to voltage division by a resistor RA3, and the TPA* cable, subject to voltage division by a resistor RA4. The bias circuit 35 is used to secure an amplitude of the signal on the TPA cable and the TPA* cable using the identical resistors RA1 and RA2. The output of the bias circuit 35 is connected to the ground line VG via the capacitor CA.

Referring to FIG. 2B, the transceiver circuit 23B comprises a driver 41 for driving a TPB cable pair (the TPB cable and TPB* cable as illustrated) with data Data_Tx, a receiver 42 for receiving a strobe signal Strb_Rx, comparators 43A and 43B for retrieving an arbitration value Arb_B_Rx, and a comparator 44 for retrieving a port status Port_Status by comparing a reference voltage Vr with the voltage at a node between the TPB cable, subject to voltage division by a resistor RB3, and the TPB* cable, subject to voltage division by a resistor RB4. The port status relates to whether the power of the interface circuit coupled to the TPB cable pair is turned on. The transceiver circuit 23B also includes power sources 45A and 45B for supplying a current corresponding to the speed code Speed_Tx for transmission to the ground line VG. The identical resistors RB1 and RB2 are connected across the TPB cable pair. The node between the resistors RB1 and RB2 is connected to the ground line VG via the resistor RB5 connected in parallel with the capacitor CB.

The interface circuit also comprises a data resynch circuit 24 for synchronizing the data received by the transceiver circuits 23A and 23B via the IEEE Std 1394 cable with the clock signal generated by the clock generation circuit 21.

A description will now be given of the operation of the interface circuit according to the first embodiment.

The control signal generation circuit 12 of the first chip 1 is supplied with various signals from the link layer circuit 11 depending on the processes on the link layer. The control signal generation circuit 12 executes state transitions on the physical layer in accordance with the supplied signals and sends a command indicating the state as a three-bit CTL signal to the state control circuit 25 of the second chip 2.

FIG. 3 lists values of the CTL signal generated by a control signal generation circuit 12, meaning of commands corresponding to the respective values, direction of data (D signal) transferred between the first chip 1 and the second chip 2, content of the D signal, in relation each other. The control signal generation circuit 12 sends the three-bit CTL signal in synchronization with the clock signal SCLK, the CTL signal being one of eight commands respectively asserting an idle status, output of a speed code, input of a speed code, output of an arbitration, input of an arbitration, setting of a speed, transmission of data and reception of data.

When the CTL signal is a binary code 000, that is, when the command for an idle state is issued, the data resync circuit 24 and the input/output control circuit 22 are controlled by the state control circuit 25 to maintain the current state.

When the CTL signal is a binary code 001, that is, when the command for output of a speed code is issued, the D signal supplied from the link layer circuit 11 to the input/output circuit has one of three values S100, S200 and S400 indicating approximate data transfer rates of 100 Mbps, 200 Mbps and 400 Mbps, respectively. The state control circuit 25 causes the input/output control circuit 22 to control the current sources 45A and 45B of the transceiver circuits 23B so as to start sending a speed code corresponding to the supplied value and continue to send the code until the next command for output of speed code is issued.

When the CTL signal is a binary code 010, that is, when the command for input of a speed code is issued, the state control circuit 25 causes the input/output control circuit 22 to supply sample values (one of three values listed above) of a speed code and the port status to the link layer circuit 11 as the D signal. The sample values are retrieved by the comparator 34 of the transceiver circuit 23A. The port status is retrieved by the comparators 44 of the transceiver circuit 23B.

When the CTL signal is a binary code 011, that is, when the command for output of an arbitration is issued, the D signal supplied by the link layer circuit 11 to the input/output control circuit 22 includes two values corresponding to arbitration control signals for the TPA cable and TPB cable, respectively. Each of the values may be one of three values. The state control circuit 25 causes the input/output control circuit 22 to control the drivers 31' and 41 of the transceiver circuits 23A and 23B, respectively, to output the corresponding arbitration control signals. The arbitration control signal is prescribed in the IEEE Standard 1394.

When the CTL signal is a binary code 100, that is, when the command for input of arbitration is issued, the state control circuit 25 causes the input/output control circuit 22 to supply samples values of the arbitration control signal retrieved by the comparators 33A, 33B, 43A and 43B of the transceiver circuits 23A and 23B, to the link layer circuit 11 as the D signal.

When the CTL signal is a binary code 101, that is, when the command for setting of a speed code is issued, the D signal supplied by the link layer circuit 11 to the input/output control circuit 22 is a value for setting an approximate data transfer rate (100 Mbps, 200 Mbps and 400 Mbps) to be provided by the interface circuit. The state control circuit 25 causes the physical layer circuit 31 to execute data transmission and reception at the data transfer rate thus set until the next command for setting the speed is issued.

When the CTL signal is a binary code 110, that is, when the command for data transmission is issued, the D signal supplied from the link layer circuit 11 to the input/output control circuit 22 is a 4-bit parallel signal when the data transfer rate is approximately set to 400 Mbps, a 2-bit parallel signal when the data transfer rate is approximately set to 200 Mbps, a 1-bit serial signal when the data transfer rate is set to 100 Mbps. The state control circuit 25 causes the input/output control circuit 22 to convert the parallel signal into a serial signal and generate the strobe signal. The state control circuit 25 causes the transceiver circuits 23A and 23B to issue the data and the strobe signal.

When the CTL signal is a binary code 111, that is, when the command for reception of data is issued, the state control circuit 25 causes the input/output control circuit 22 to supply the signal received by the transceiver circuits 23A and 23B to the data resync circuit 24. The data resync circuit 24 synchronizes the data retrieved from the received signal with the clock signal SCLK and supply the synchronized data to the link layer circuit 11 as a 4-bit parallel signal when the data transfer rate is approximately set to 400 Mbps, as a 2-bit parallel signal when the data transfer rate is approximately set to 200 Mbps, as a 1-bit serial signal when the data transfer rate is approximately set to 100 Mbps.

FIG. 4 is a timing chart showing an example of how the clock signal SCLK, the CTL signal and the D signal are related to each other in data transmission and reception. As shown in FIG. 4, transmission and reception of data takes place at the rising edge and the falling edge of the 49.152 MHz clock signal. When the data is exchanged as the 4-bit parallel D signal, a processing speed of 393.216 MHz (=49.152 MHz×2×4), that is, an approximate data speed of 400 Mbps is provided. When the data is exchanged as the 2-bit parallel signal, a processing speed of 196.608 MHz (=49.152 MHz×2×2), that is, an approximate data speed of 200 Mbps is available. When the data is exchanged in as the 1-bit serial signal, a processing speed of 98.304 MHz (49.152 MHz×2×1), that is, an approximate data speed of 100 Mbps is provided.

As described, the first embodiment is configured such that parts of the circuitry executing processes on the physical layer are accommodated in the link chip. More specifically, state machines built in the related-art control circuit as well as the related-art arbiter circuit, composed only of a logic circuitry and having a relatively large circuit scale, are implemented as the control signal generation circuit 12 in the first chip, which also includes the link layer circuit 11. The remaining circuitry for processes on the physical layer is implemented as the physical layer circuit 31 accommodated in the second chip. By fabricating the first chip as a high-integration circuit using the current microfabrication technology, a relatively large portion of the circuitry for physical layer processes is fabricated with a high degree of integration. Moreover, the number of cables connecting the two chips is reduced so that the benefit of cost reduction is available.

Embodiment 2

Figure 5:
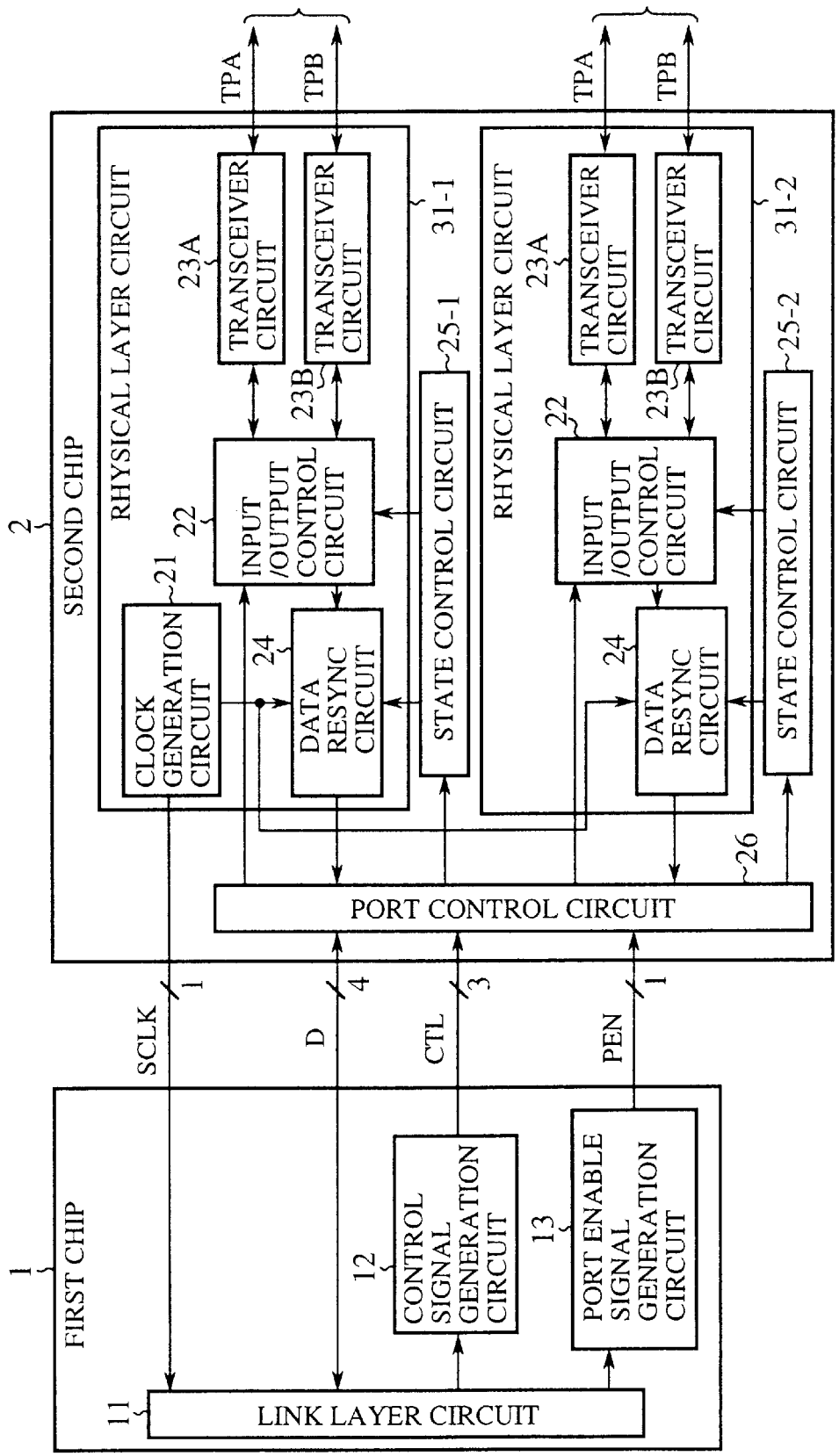
FIG. 5 is a block diagram showing the construction of an interface circuit according to a second embodiment of the present invention.

The interface circuit according to the second embodiment of the present invention has a plurality of ports. FIG. 5 is a block diagram showing the construction of the interface circuit according to the second embodiment.

The first chip 1 shown in FIG. 5 comprises a port enable signal generation circuit 13 for selecting a port in accordance with a predetermined signal from the link layer circuit 11 and supplying a binary port enable signal (hereinafter, referred to as a PEN signal) indicating the selected port to a port control circuit 26 of the second chip 2.

The port control circuit 26 selects a physical layer circuit 31-1 or 31-2 to exchange therewith the D signal and supply the CTL signal thereto, in accordance with the PEN signal from the first chip 1. The interface circuit of FIG. 5 also includes a state control circuit 25-1, identical with the state control circuit 25 of FIG. 1, for controlling the physical layer circuit 31-1 for the first port, and a state control circuit 25-2, identical with the state control circuit 25 of FIG. 1, for controlling the physical layer circuit 71-2 for the second port. The physical layer circuits 31-1 and 31-2 are identical with the physical layer circuit 35 of FIG. 1. The clock generation circuit 21 of the physical layer circuit 31-1 is also used by the physical layer circuit 31-2.

The other components shown in FIG. 5 are the same as the corresponding components of the first embodiment (FIG. 1) and the description thereof is omitted.

A description will now be given of the operation of the interface circuit according to the second embodiment.

The port enable signal generation circuit 13 of the first chip 1 selects a port in accordance with a predetermined signal from the link layer circuit 11 and supplies the PEN signal indicating the selected port in a binary code to the port control circuit 26 of the second chip 2. Since there are two ports in the interface circuit of FIG. 5, a 1-bit PEN signal is supplied.

The control signal generation circuit 12 of the first chip 1 is supplied with various signals from the link layer circuit 11 depending on the processes on the link layer and performs state transitions on the physical layer appropriately in accordance with the supplied signals. The control signal generation circuit 12 also supplies commands indicating the state of the physical layer to the port control circuit 26 of the second chip 2, in the form of a three-bit CTL signal. More specifically, the three-bit CTL signal issued by the control signal generation circuit 12 is one of eight commands asserting an idle state, output of a speed code, input of a speed code, output of an arbitration control signal, input of an arbitration control signal, setting of a speed, data transmission and data reception, respectively. The CTL signal is issued in synchronization with the clock signal SCLK.

When the CTL signal is 000 or 101, that is, when the command asserts an idle state or output of a speed code, the port control circuit 26 supplies the CTL signal to both of the state control circuits 25-1 and 25-2 irrespective of the value of the PEN signal. Each of the state control circuits 25-1 and 25-2 operates like the state control circuit 25 of FIG. 1.

When the CTL signal is 001, 010, 011, 100 or 110, that is, when the command asserts output of a speed code, input of a speed code, output of an arbitration control signal, input of an arbitration control signal or data transmission, the port control circuit 26 electrically connects the physical layer circuit for the port indicated by the PEN signal with the link layer circuit 11 and also supplies the CTL signal to the state control circuit for the port indicated by the PEN signal. The state control circuit supplied with the CTL signal operates like the state control circuit 25 of FIG. 1 and the physical layer circuit connected to the link layer circuit 11 operates like the physical layer circuit 31 of FIG. 1 so that output of a speed code, input of a speed code, output of an arbitration control signal, input of an arbitration control signal or data transmission is executed appropriately.

When the CTL signal is 111, that is, the command asserts data reception, the port control circuit 26 operates as a repeater by supplying data received by the physical layer circuit for the port indicated by the PEN signal to the physical layer circuit for the other port and to the link layer circuit 11. The port control circuit 26 also supplies the CTL signal indicating reception of data to the state control circuit for the port indicated by the PEN signal and supplies the command for data transmission to the state control circuit for the other port. The port indicated by the PEN signal is a data reception port and the other port is a data transmission port for transparently forwarding received data as it is.

Like the state control circuit 25 of FIG. 1, the state control circuit of FIG. 5 supplied with the data reception command causes the associated physical layer circuit to receive data and the other state control circuit supplied with the data transmission command causes the associated physical layer circuit to transmit data.

While it is assumed that the interface circuit according to the second embodiment is provided with two ports, the interface circuit may also have three or more ports. When there are two ports, the PEN signal is a 1-bit signal. When there are three or four ports, the PEN signal is a 2-bit signal. When there are five to eight ports, the PEN signal is a 3-bit signal. The number of bits constituting the PEN signal may be the same as the number of ports.

Thus, the second embodiment is adapted for provision of a plurality of ports in that the first chip 1 selects a port and supplies the PEN signal indicating the selected port to the second chip 2 so that the exchange of the CTL signal and the D signal is controlled to occur at a port selected by switching. In this way, increase in the number of cables between the first chip and the second chip due to the provision of the plurality of ports is prevented.

Embodiment 3

Figure 6:
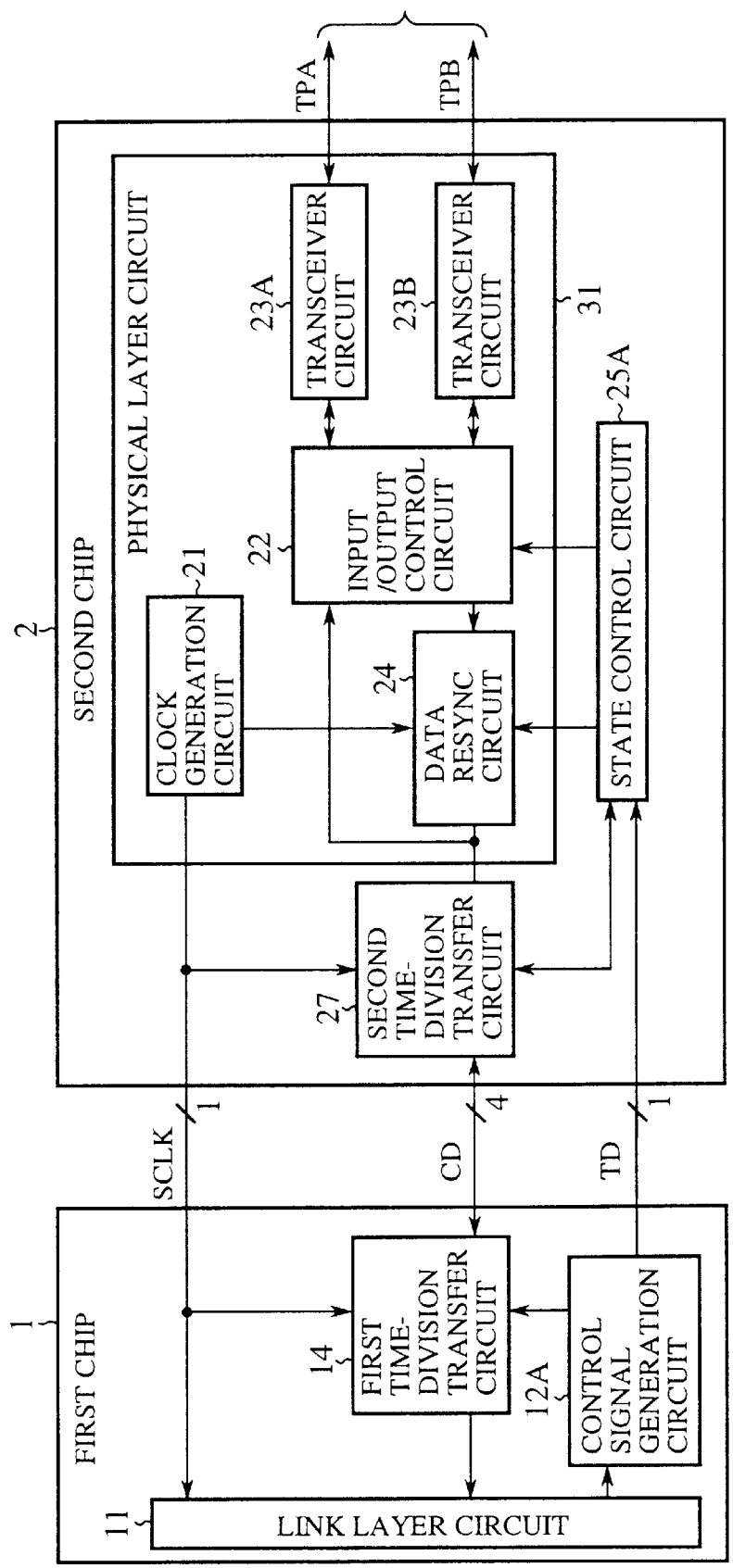
FIG. 6 is a block diagram showing the construction of an interface circuit according to a third embodiment of the present invention.

The interface circuit according to the third embodiment operates such that the D signal and the CTL signal are transferred as a CD signal between the first chip 1 and the second chip 2 according to time-division multiplexing. FIG. 6 is a block diagram showing the construction of the interface circuit according to the third embodiment.

Referring to FIG. 3, like the control signal generation circuit 12 of FIG. 1, a control signal generation circuit 12A generates a CTL signal and supplies the same to a first time-division transfer circuit 14. When data transmission or data reception is continued, the control signal generation circuit 12A asserts a 1-bit TD signal so as to notify a state control circuit 25A of the continuation of data transmission. Like the state control circuit 25 of FIG. 1, the state control circuit 25A controls the physical layer circuit 31. When the TD signal is asserted, the state control circuit 25A notifies a second time division transfer circuit 27 of the continuation of data transmission.

The first time division transfer circuit 14 performs time division transfer of the CTL signal and the D signal in the form of the 4-bit CD signal. The second time division transfer circuit 27 performs time division transfer of data using predetermined time slots of the CD signal.

The other components of the interface circuit of FIG. 6 are the same as the corresponding components of the first embodiment (FIG. 1) and the description thereof is omitted.

A description will now be given of the operation of the interface circuit according to the third embodiment.

When the CTL signal is 001, 010, 011 or 101, the first and second time division transfer circuits 14 and 27 transfer the CD signal using two time slots. A period of transfer is defined by two pulses of the clock signal SCLK. The CTL signal is transferred using the first time slot (first half of the period). The D signal (the speed code or the arbitration control signal) is transferred using the second time slot (second half of the period). The transferred CTL signal is supplied from the second time division transfer circuit 27 to the state control circuit 25A. The transferred D signal is supplied from the first time division transfer circuit 14 to the link layer circuit 11 or from the second time division circuit 27 to the physical layer circuit 31. Like the state control circuit 25 of FIG. 1, the state control circuit 25A controls the physical layer circuit 31 in accordance with the supplied CTL signal.

When the CTL signal is 000, that is, when the command asserts an idle state, it is not necessary to perform data transmission. The CTL signal is transferred at a period defined by one pulse of the clock signal SCLK. More specifically, the CTL signal is supplied from the second time division transfer circuit 27 to the state control circuit 25A. Like the state control circuit 25 of FIG. 1, the state control circuit 25A controls the physical circuit 31 in accordance with the CTL signal.

When the CTL signal is 110 or 111, that is, when the command asserts data transmission or data reception, the control signal generation circuit 12A asserts the TD signal so that the state control circuit 25A notifies the second time division transfer circuit 27 of the continuation of data transfer. The first and second time division transfer circuits 14 and 27 transfer the CTL signal using the first time slot of the first period and continue to transfer the D signal (in this case, data) using the subsequent time slots. The transferred CTL signal is supplied from the second time division circuit 27 to the state control circuit 25A. Like the state control circuit 25 of FIG. 1, the state control circuit 25A causes the physical layer circuit 31 to perform data transmission or data reception in accordance with the transferred CTL signal.

By transferring the CTL signal and the D signal according to time division multiplexing, the third embodiment provides a benefit that the number of cables between the first chip and the second chip is reduced.

The present invention is not limited to the above-described embodiments, and variations and modifications may be made without departing from the scope of the present invention.

What is claimed is:

1. An interface circuit for executing processes on a link layer and a physical layer of an interface that complies with IEEE Standard 1394, comprising:

a first chip having a link layer circuit for executing processes on the link layer and a first control circuit for executing state transitions of the processes on the physical layer and for executing an arbitration process; and a second chip having a physical layer circuit for executing processes on the physical layer based on the state transitions executed by said first control circuit, wherein said first chip has a smaller minimum fabrication dimension than said second chip.

2. The interface circuit according to claim 1, wherein said first control circuit generates a control signal corresponding to a state of the processes on the physical layer, and said second chip includes a second control circuit for controlling the physical layer circuit in accordance with a control signal.

3. The interface circuit according to claim 2, wherein said first chip is provided with a first time-division transfer circuit and said second chip is provided with a second time-division transfer circuit so as to transfer the control signal from said first chip to said second chip according to time-division multiplexing, the first and second time-division transfer circuit sharing a first cable between said first chip and said second chip;

when data is being transmitted or received, said first control circuit stops time-division transfer of the control signal by the first time-division transfer circuit and supplies a data indication signal indicating that the data is being transmitted or received to the second control circuit using a second cable different from the first cable; and the second control circuit stops time-division transfer of the control signal by the second time-division transfer circuit when the data indication signal is supplied.

4. The interface circuit according to claim 1, wherein the physical layer circuit is provided for at least one port in said second chip, the second control circuit is provided for at least one port in said second chip, and said second chip further comprises a port control circuit for connecting with said first chip the physical layer circuit and the second control circuit corresponding to a selected port.

* * * * *